United States Patent
Yeh et al.

(10) Patent No.: US 8,582,930 B2
(45) Date of Patent: Nov. 12, 2013

(54) FIBER SENSING SYSTEMS AND FIBER SENSING METHODS

(75) Inventors: Chien-Hung Yeh, Hsinchu (TW); Chi-Wai Chow, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 119 days.

(21) Appl. No.: 13/238,528

(22) Filed: Sep. 21, 2011

(65) Prior Publication Data

US 2012/0328231 A1    Dec. 27, 2012

(30) Foreign Application Priority Data

Jun. 24, 2011 (TW) .............................. 100122130 A (51) Int. Cl.
*G02B 6/00* (2006.01)
*G02B 6/34* (2006.01)
*G02B 6/26* (2006.01)

(52) U.S. Cl.
USPC ................................. 385/12; 385/37; 385/46

(58) Field of Classification Search
USPC ............................................................ 385/12
See application file for complete search history.

(56) References Cited

U.S. PATENT DOCUMENTS

| | | | |
|---|---|---|---|
| 7,043,103 B2 | 5/2006 | Chi et al. | |
| 2009/0238218 A1 | 9/2009 | Yao | |
| 2010/0183258 A1* | 7/2010 | Chow et al. | ................ 385/12 |

FOREIGN PATENT DOCUMENTS

TW    552438 B    9/2003

OTHER PUBLICATIONS

Kerrouche et al., "Strain Measurement on a Rail Bridge Loaded to Failure Using a Fiber Bragg Grating-Based Distributed Sensor System", IEEE Sensors Journal, Dec. 2008, vol. 8, No. 12, pp. 2059-2065.
Kunzler et al., "Integrating Fiber Bragg Grating Sensors with Sensor Networks", IEEE AUTOTESTCON, Sep. 2008, pp. 354-359.
Peng et al., "Reliable Fiber Sensor System with Star-Ring-Bus Architecture", Sensors, 2010, vol. 10, pp. 4194-4205.
Wu et al., "Three-Dimensional Mesh-Based Multipoint Sensing System With Self-Healing Functionality", IEEE Photonics Technology Letters, Apr. 15, 2010, vol. 22, No. 8, pp. 565-567.

\* cited by examiner

*Primary Examiner* — Omar Rojas
(74) *Attorney, Agent, or Firm* — Birch, Stewart, Kolasch & Birch, LLP (57) ABSTRACT

A fiber sensing system is provided, including a plurality of ring structures, an optical coupler and a switching unit. Each of the ring structures has at least one fiber sensor to receive and reflect a light source signal. The optical coupler is directly connected to the ring structures thereby injecting the light source signal into the ring structures to form a plurality of loops. The switching unit is disposed in a central office having two output terminals coupled to the ring structure respectively by the optical coupler, thereby forming a first path and a second path in the loops, such that the light source signal is injected into the first path and the second path sequentially by the switching unit.

14 Claims, 11 Drawing Sheets

FIBER SENSING SYSTEMS AND FIBER SENSING METHODS

CROSS REFERENCE TO RELATED APPLICATIONS

This Application claims priority of Taiwan Patent Application No. 100122130, filed on Jun. 24, 2011, the entirety of which is incorporated by reference herein.

BACKGROUND OF THE INVENTION

1. Field of the Invention

The present invention relates to optical network systems, and in particular relates to a fiber sensing system.

2. Description of the Related Art

In recent years, Fiber Bragg Grating (FBG) has become an important element in the field of optical sensing. Among the sensing systems that use FBG primarily, the ability of providing diversified division multiplexing is one of the most important characteristics for the sensing systems. FBG can be applied to division multiplexing, such as wavelength-division multiplexing (WDM), space-division multiplexing (SDM), time-division multiplexing (TDM), code-division multiple access (CDMA), strength wavelength-division multiplexing and frequency-modulated continuous-wave (CW) multiplexing. Based on the existing division multiplexing technology and their ability to combine with each other, long range FBG sensing systems can be easily manufactured. Therefore, enhancing reliability and survivability of the FBG sensing system has become an important issue recently. In general, networks using architecture such as bus (in-line) topology, tree (star) topology and ring topology are unable to provide protection functions for the sensing system. For instance, when a fault point appears on a fiber line with bus topology, the fiber sensor is no longer able to provide any sensing for any part of the fiber line beyond the fault point. Therefore, there is a need for a fiber sensing system to completely sense all optical networks.

BRIEF SUMMARY OF THE INVENTION

In light of the previously described problems, the invention provides an embodiment of a fiber sensing system, including a plurality of ring structures, an optical coupler and a switching unit. Each of the ring structures has at least one fiber sensor to receive and reflect a light source signal. The optical coupler is directly connected to the ring structures thereby injecting the light source signal into the ring structures to form a plurality of loops. The switching unit is disposed in a central office having two output terminals coupled to the ring structure respectively by the optical coupler, thereby forming a first path and a second path in the loops, such that the light source signal is injected into the first path and the second path sequentially by the switching unit.

The disclosure also provides a fiber sensing method. The fiber sensing method includes the steps of: providing a plurality of ring structures to form a plurality of loops, wherein each of the ring structures comprises at least one fiber sensor to receive and reflect a light source signal; and forming a first path and a second path in the loops, such that the light source signal is injected into the first path and the second path respectively by the switching unit, wherein the switching unit is disposed in a central office.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
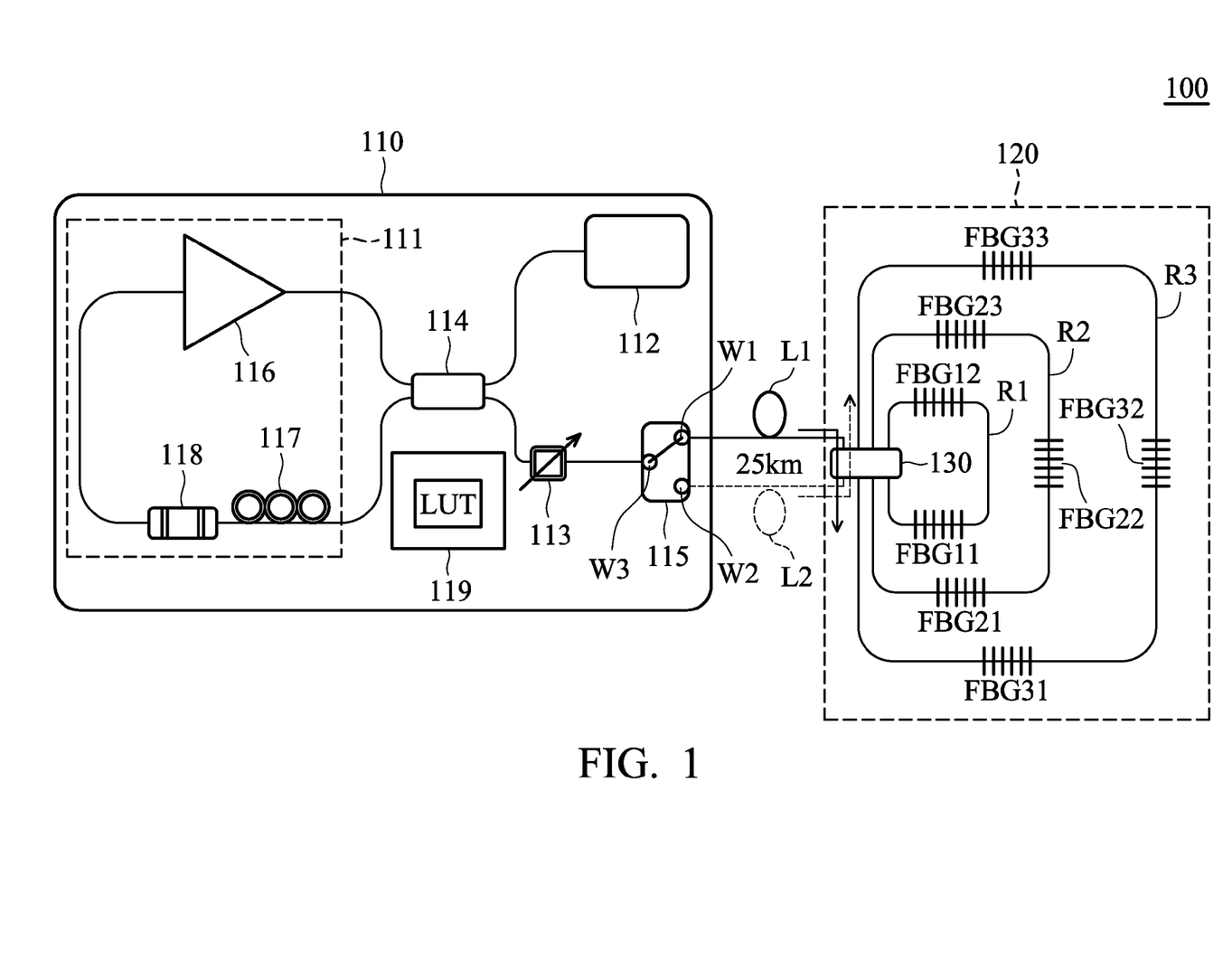
FIG. 1 illustrates an embodiment of the fiber sensing system.

FIG. 1 illustrates an embodiment of the fiber sensing system. As shown in FIG. 1, a fiber sensing system 100 includes a central office 110, a ring architecture unit 120 and an optical coupler 130 disposed outside of the central office 110. In detail, the ring architecture unit 120 includes a plurality of ring structures. Each of the ring structures has at least one fiber sensor to receive and reflect a light source signal. The fiber sensor has a central wavelength different from another fiber sensor. The fiber sensor reflects the light source signal to generate a reflective signal corresponding to the fiber sensor when the fiber sensor receives the light source signal.

For example, the ring architecture unit 120 includes ring structures R1, R2 and R3. The ring structure R1 has fiber sensors FBG11 and FBG12. The ring structure R2 has fiber sensors FBG21, FBG22 and FBG23. The ring structure R3 has fiber sensors FBG31, FBG32 and FBG 33, in which the fiber sensors FBG11, FBG12, FBG21, FBG22, FBG23, FBG31, FBG32 and FBG33 are fiber Bragg gratings (FBG), but are not limited thereto. The optical coupler 130 directly connects to the ring structures R1, R2 and R3 to a plurality of loops.

Next, the central office 100 includes a tunable laser source 111, an optical spectrum analyzer (OSA) 112, a variable optical attenuator (VOA) 113, an optical coupler 114, a processing unit 119 and a switching unit 115. In detail, the switching unit 115 has an input terminal W3 and output terminals W1 and W2. The input terminal W3 receives the light source signal. The output terminals W1 and W2 are coupled to the ring architecture unit 120 through the optical coupler 130 respectively to generate paths L1 and L2 in the ring structures R1, R2 and R3, such that the light source signal is injected into the paths L1 and L2 by the switching unit 115. In the embodiment, the paths L1 and L2 are in the same loop, but the directions of the paths L1 and L2 are opposite.

The tunable laser source 111 is coupled to the light coupler 114 and outputs the light source signal to the switching unit 115 by the light coupler 114, in which the tunable laser source 111 includes an Erbium doped fiber amplifier (EDFA) 116, a polarization controller (PC) 117 and a tunable bandpass filter (TBF) 118. The optical spectrum analyzer 112 analyzes first and second reflective signals respectively reflected from the first and second paths to generate a first data and a second data.

The processing unit 119 analyzes the first and second data in accordance with a lookup table (LUT) to determine where a fault point of the ring structures is. In addition, the processing unit 119 adjusts the tunable laser source 111 such that the light source signal outputted from the tunable laser source 111 has a central wavelength corresponding to the fiber sensor. Furthermore, the processing unit 119 can control all devices in the central office 110.

Figure 2A:
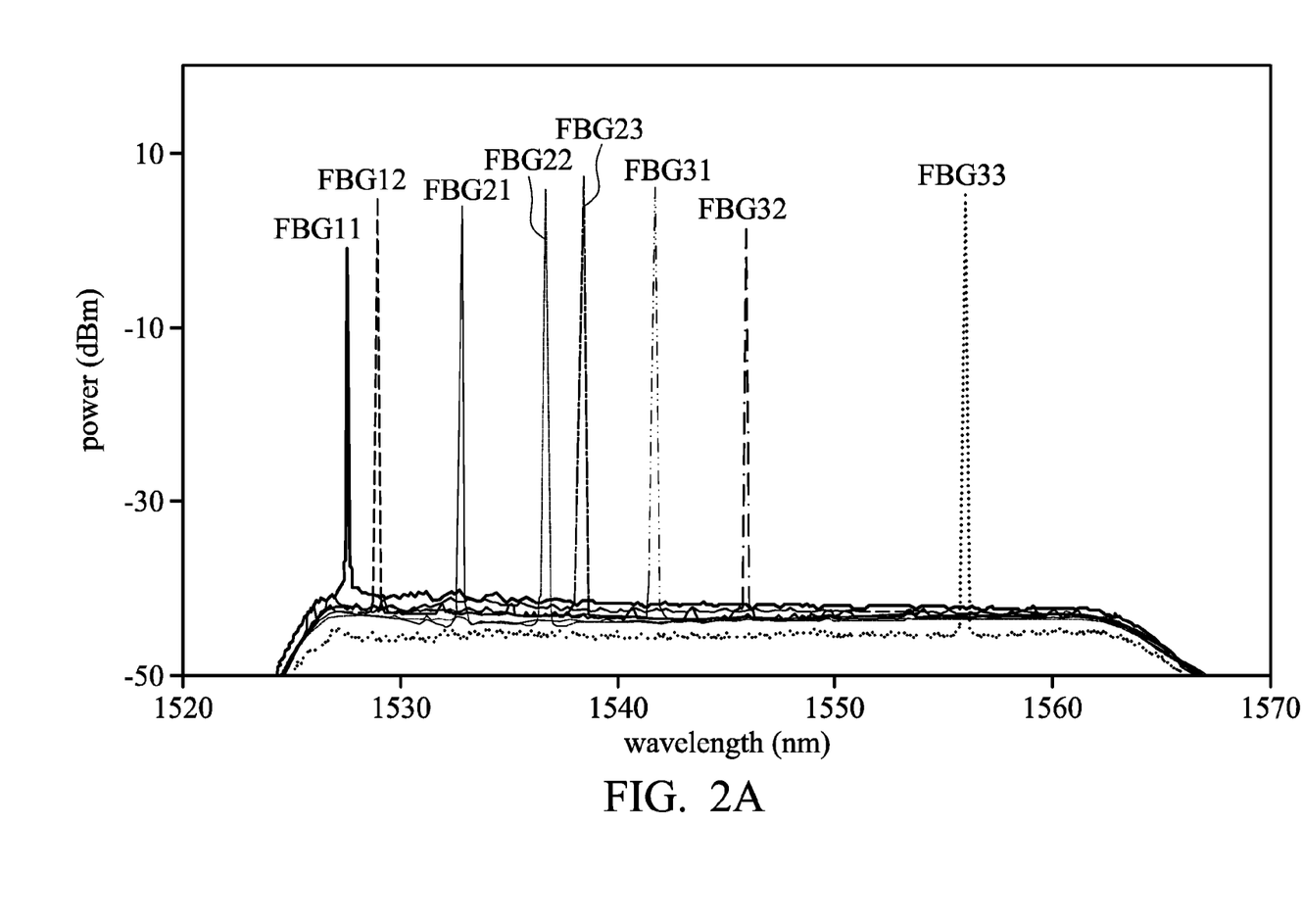
FIG. 2A illustrates a waveform of the reflective signal of the disclosure to illustrate the first reflective signal of the path L1.
Figure 2B:
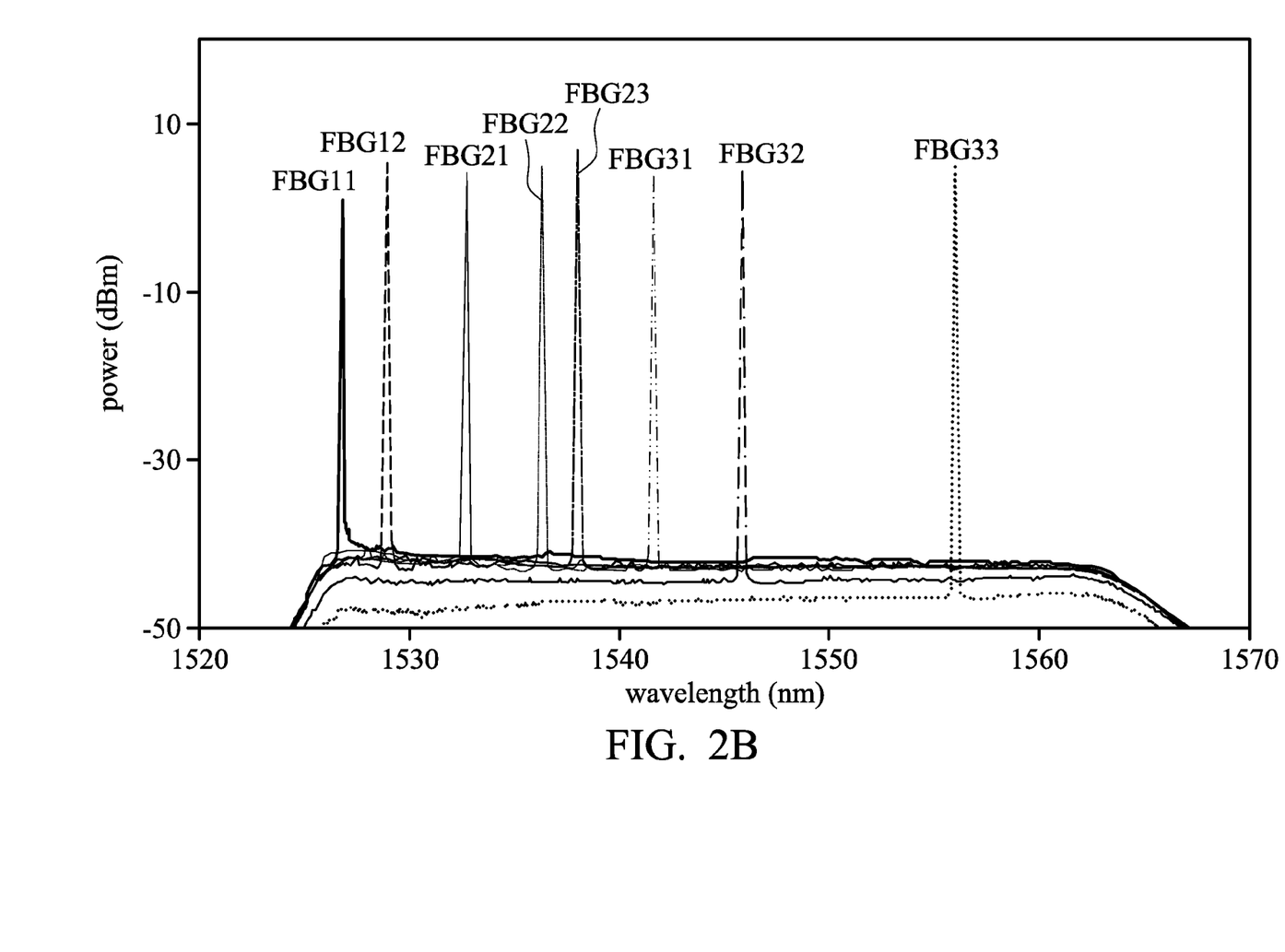
FIG. 2B illustrates a waveform of the reflective signal of the disclosure to illustrate the second reflective signal of the path L2.

FIG. 2A and FIG. 2B illustrate waveforms showing an embodiment of reflective signals of the disclosure to illustrate the first reflective signal of the path L1 and the second reflective signal of the path L2, respectively. As shown in FIGS. 2A and 2B, the first and second reflective signals show all central wavelengths of the fiber sensors. In other words, there is no fault point in the ring structures R1, R2 and R3.

Figure 3A:
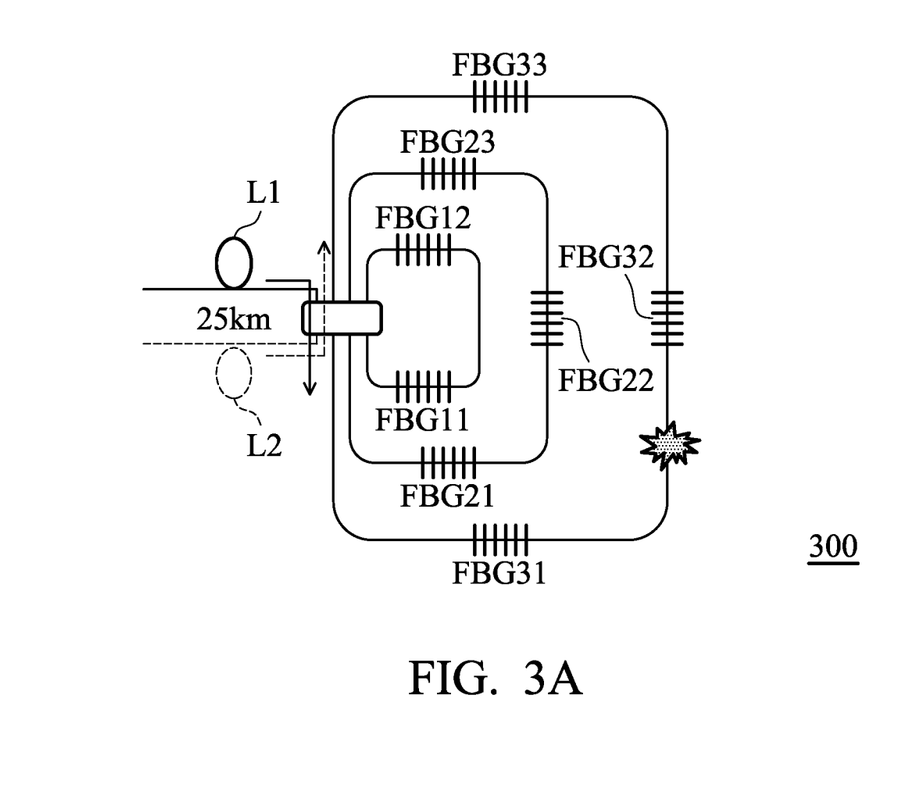
FIG. 3A illustrates a schematic view of the fiber sensing system of the disclosure to illustrate the fiber sensing system 300 having fault points between the fiber sensors FBG31 and FBG 32.
Figure 3B:
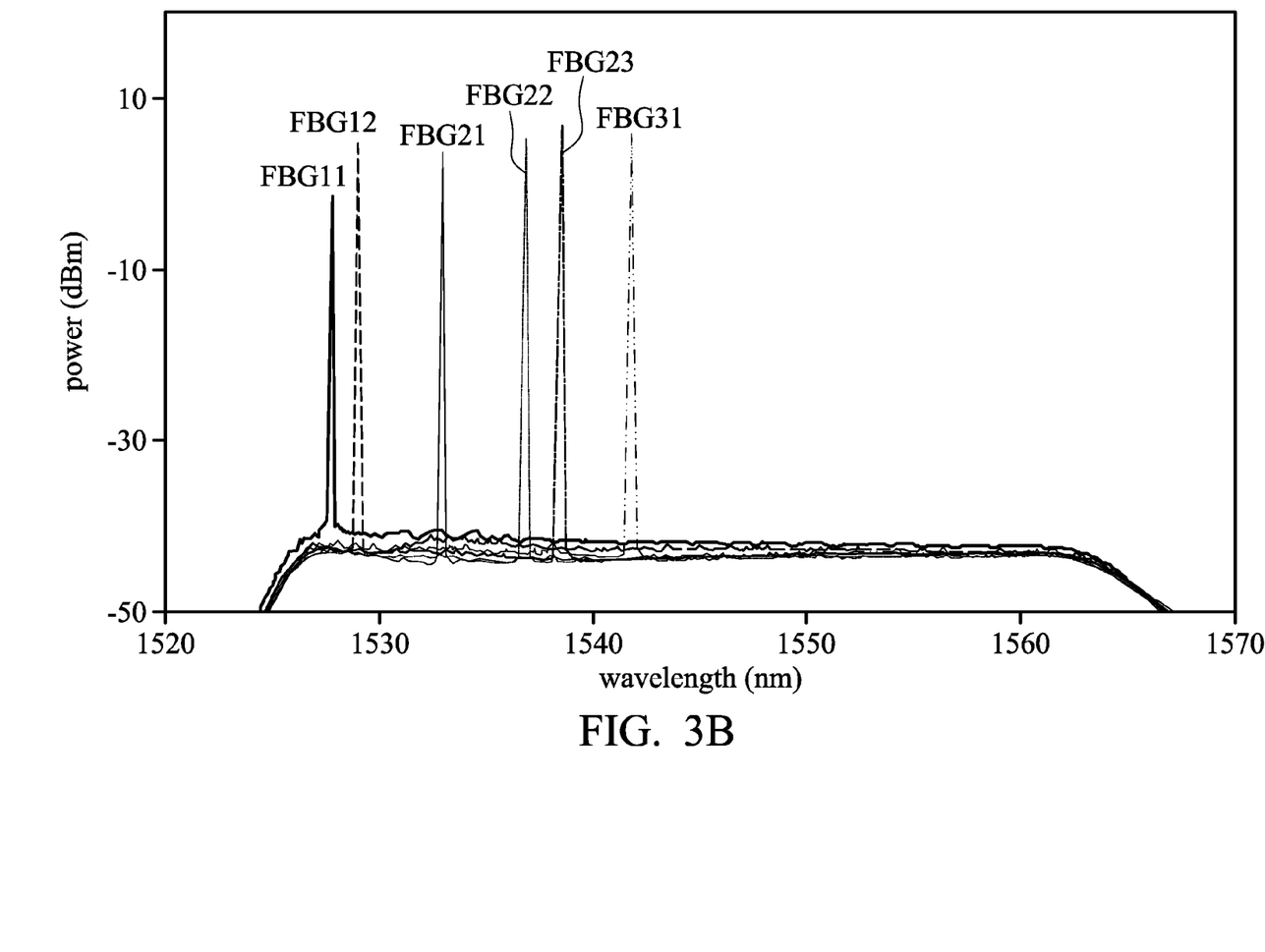
FIG. 3B illustrates a waveform of the reflective signal of the disclosure to illustrate the first reflective signal of the fiber sensing system 300.
Figure 3C:
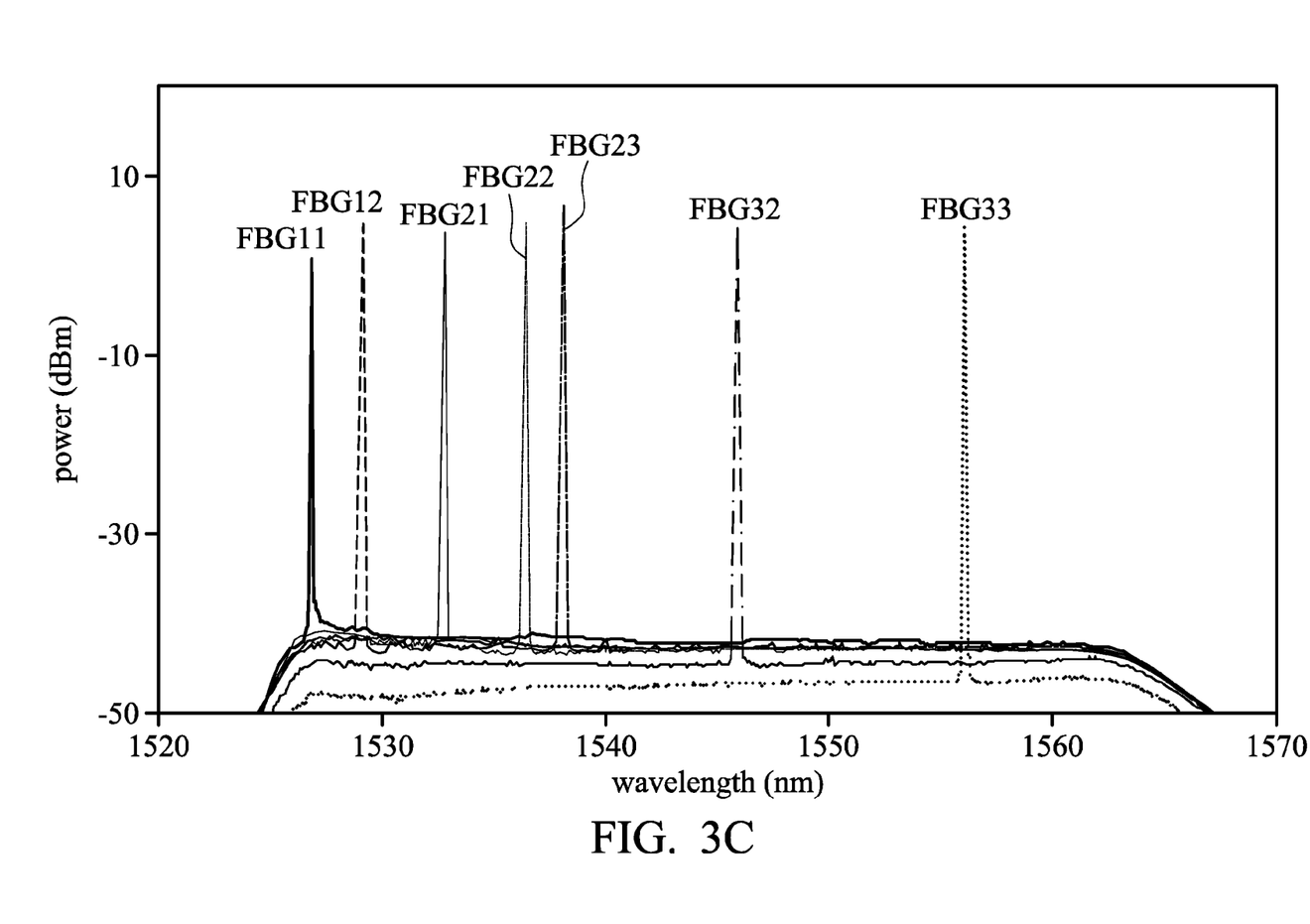
FIG. 3C illustrates a waveform of the reflective signal of the disclosure to illustrate the second reflective signal of the fiber sensing system 300.

FIG. 3A is a schematic view showing an embodiment of the fiber sensing system of the disclosure to illustrate the fiber sensing system 300 having a fault point between the fiber sensors FBG31 and FBG32. FIG. 3B and FIG. 3C show waveforms of the reflective signals of the disclosure to illustrate the first and second reflective signals of the fiber sensing system 300, respectively. As shown in FIGS. 3B and 3C, the waveform of the first reflective signal does not show the central wavelengths of the fiber sensors FBG32 and FBG33. The waveform of the second reflective signal does not show the central wavelengths of the fiber sensor FBG31. Therefore, the processing unit 119 analyzes the data shown in the FIGS. 3B and 3C in accordance with the lookup table to determine that the fiber sensing system 300 has a fault point between the fiber sensors FBG31 and FBG32.

Figure 4A:
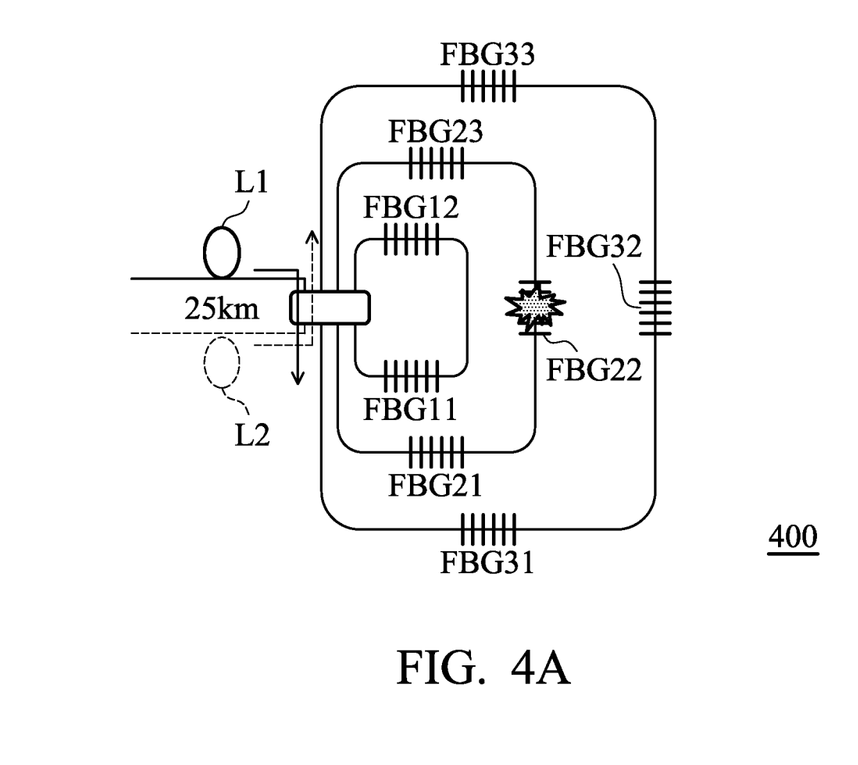
FIG. 4A illustrates a schematic view of the fiber sensing system of the disclosure to illustrate the fiber sensing system 400 having fault points on the fiber sensors FBG22.
Figure 4B:
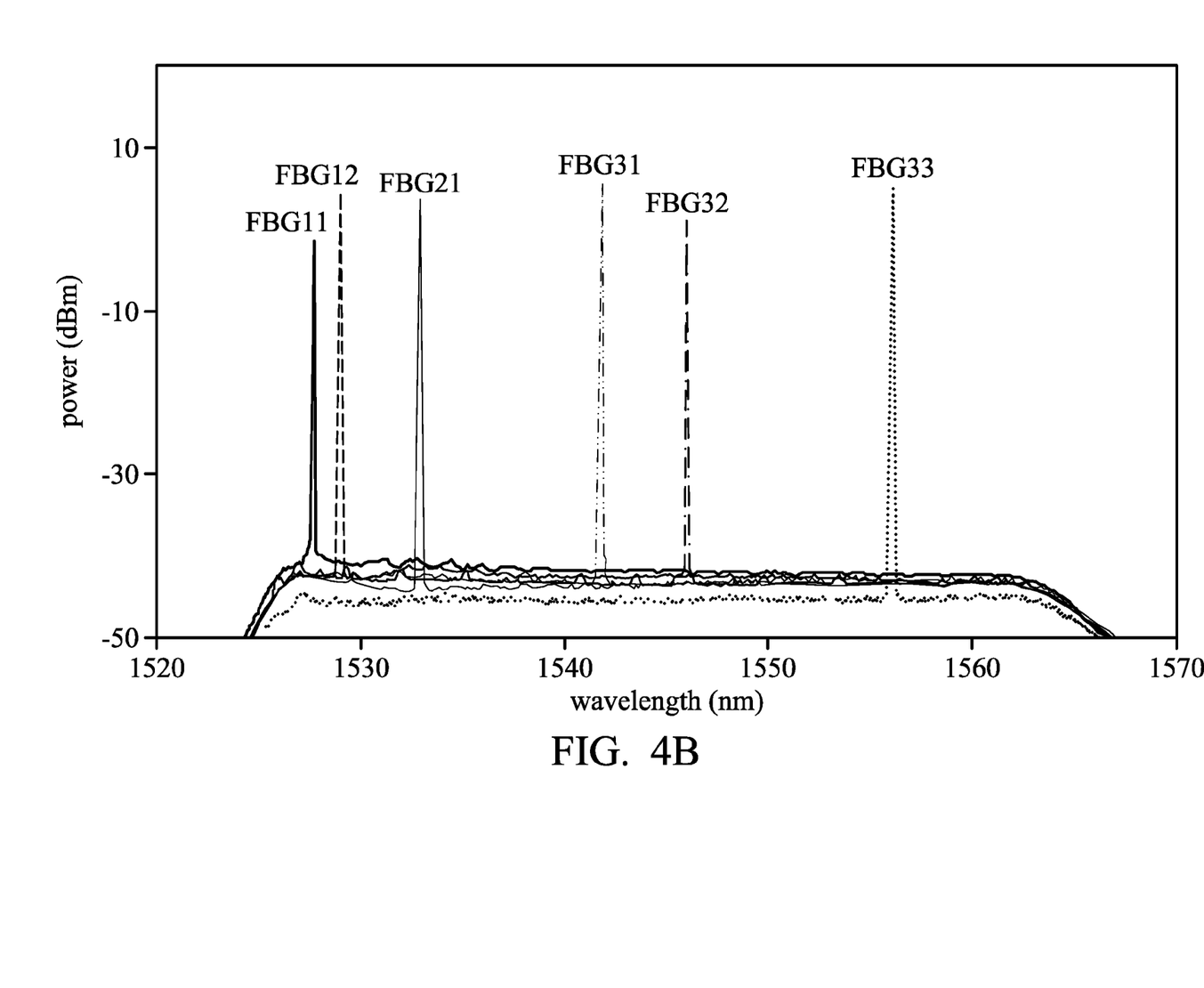
FIG. 4B illustrates a waveform of the reflective signal of the disclosure to illustrate the first reflective signal of the fiber sensing system 400.
Figure 4C:
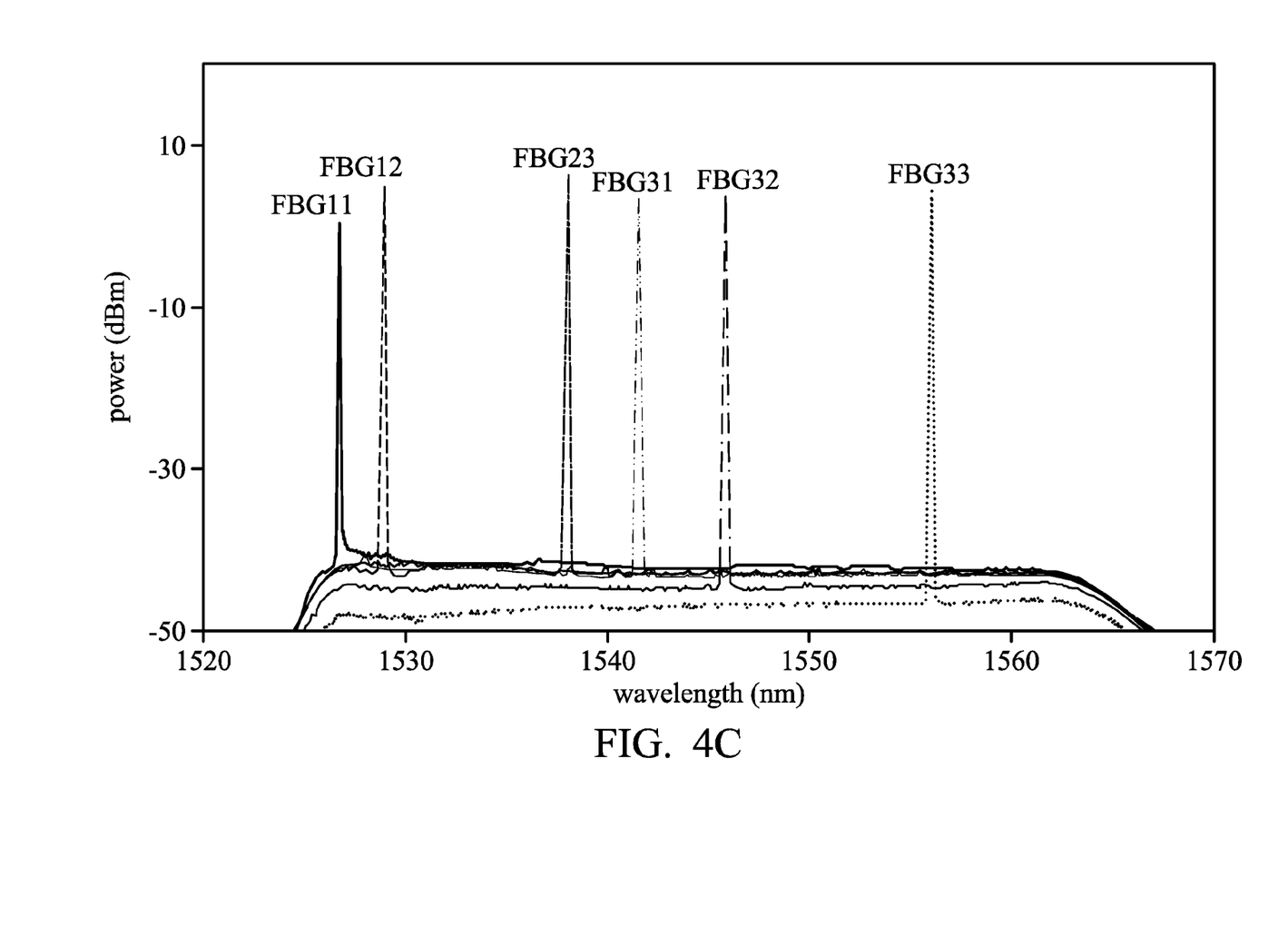
FIG. 4C illustrates a waveform of the reflective signal of the disclosure to illustrate the second reflective signal of the fiber sensing system 400.

FIG. 4A is a schematic view of the fiber sensing system of the disclosure to illustrate the fiber sensing system 400 having a fault point in the fiber sensors FBG22. FIG. 4B and FIG. 4C show waveforms of the reflective signals of the disclosure to illustrate the first and second reflective signals of the fiber sensing system 400, respectively. As shown in FIGS. 4B and 4C, the waveform of the first reflective signal does not show the central wavelengths of the fiber sensors FBG22 and FBG23. The waveform of the second reflective signal does not show the central wavelengths of the fiber sensors FBG21 and FBG22. Therefore, the processing unit 119 analyzes the data shown in the FIGS. 4B and 4C in accordance with the lookup table to determine that the fiber sensing system 400 has a fault point on the fiber sensor FBG22.

Figure 5:
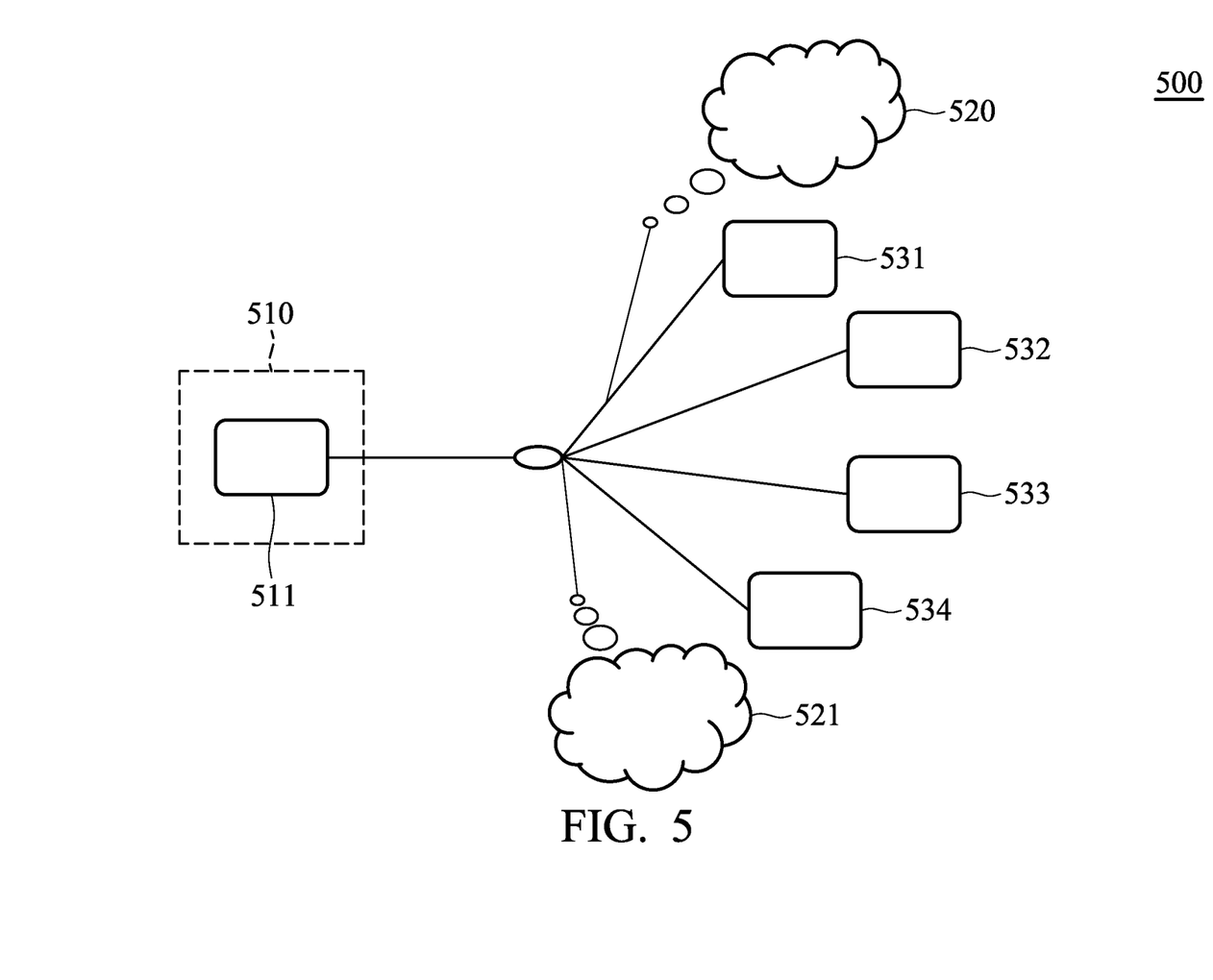
FIG. 5 illustrates an embodiment of the passive optical network.

FIG. 5 illustrates an embodiment of the passive optical network, in which a passive optical network (PON) 500 integrates the fiber sensing system 100. As shown in FIG. 5, the passive optical network 500 includes a central office 510, ring architecture units 520 and 521, and optical network units (ONU) 531, 532, 533 and 534, in which the amount of the ring architecture unit and the optical network units is an example for illustration, but is not limited thereto. The central office 510 integrates the central office 110 with an optical line terminal (OLT) 511. Each of the ring architecture units 520 and 521 can be the ring architecture unit 120. As the ring architecture units 520 and 521 can be disposed in any path of the optical network, the central office 110 (or the central office 510) can detect where a fault point of the optical network of the passive optical network 500 is.

Figure 6:
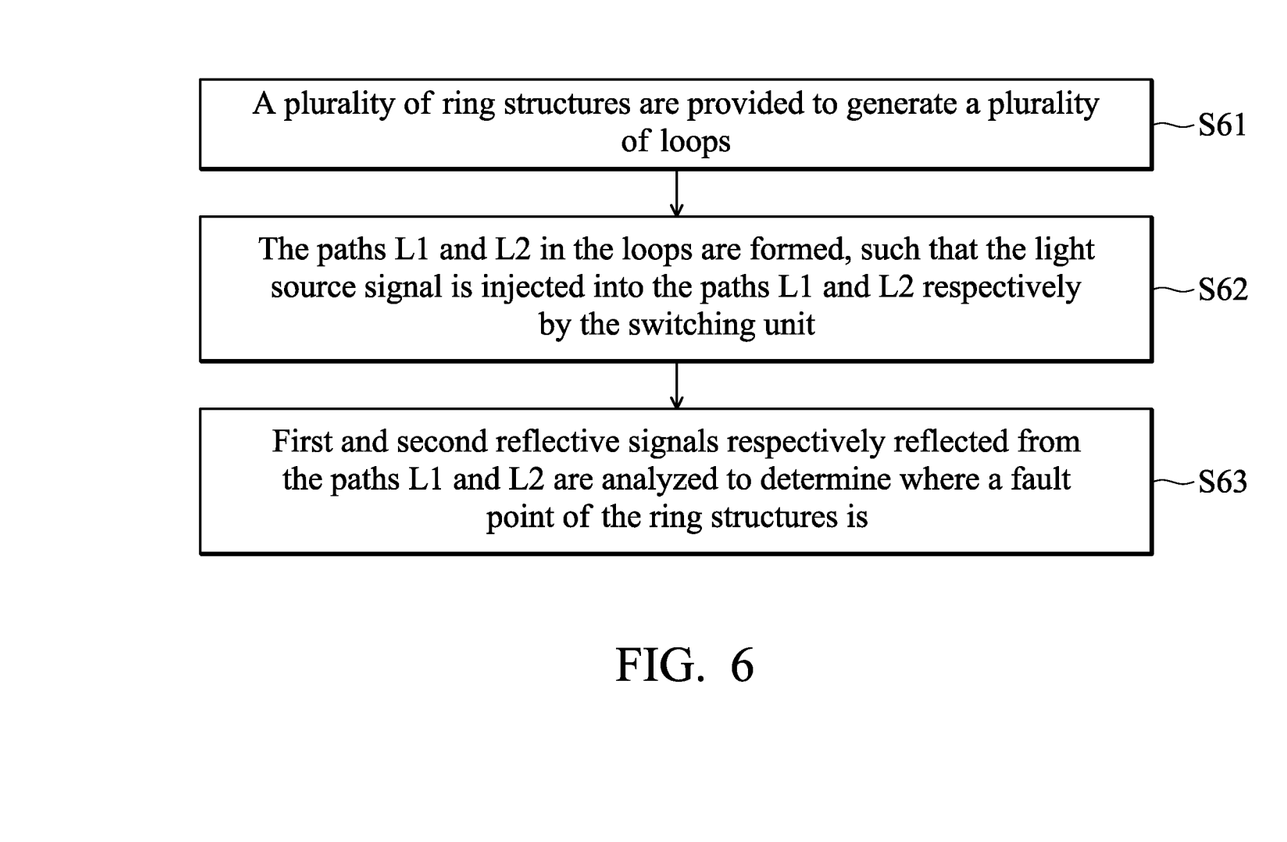
FIG. 6 illustrates a sequence diagram of the fiber sensing method.

FIG. 6 illustrates a sequence diagram of the fiber sensing method. As shown in FIG. 6, the fiber sensing method includes the following steps.

In step S61, a plurality of ring structures are provided to generate a plurality of loops, wherein each of the ring structures comprises at least one fiber sensor to receive and reflect a light source signal. In step S62, the paths L1 and L2 in the loops are formed, such that the light source signal is injected into the paths L1 and L2 respectively by the switching unit 115, wherein the switching unit 115 is disposed in the central office 110. In step S63, first and second reflective signals respectively reflected from the paths L1 and L2 are analyzed to determine where a fault point of the ring structures is.

The present fiber sensing system forms the paths L1 and L2 by the switching unit 115. Thus, the present fiber sensing system senses the path behind a fault point to precisely figure out where the fault point is when the ring structures R1, R2 or R3 have a fault point.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fiber sensing system, comprising
   a plurality of ring structures, wherein each of the ring structures has at least one fiber sensor to receive and reflect a light source signal;
   an optical coupler, directly connected to each of the ring structures thereby injecting the light source signal into the ring structures to form a plurality of loops; and
   a switching unit, disposed in a central office having two output terminals coupled to the ring structures respectively by the optical coupler, thereby forming a first path and a second path in the loops, such that the light source signal is injected into the first path and the second path sequentially by the switching unit, wherein the output terminals of the switching unit are coupled to the ring structures by the optical coupler without a remote node or another optical coupler.

2. The fiber sensing system as claimed in claim 1, wherein the central office comprises a tunable laser source outputting the light source signal to the switching unit.

3. The fiber sensing system as claimed in claim 2, wherein the tunable laser source is a tunable Erbium-fiber laser.

4. The fiber sensing system as claimed in claim 1, wherein the central office comprises an optical spectrum analyzer analyzing first and second reflective signals respectively reflected from the first and second paths to generate a first data and a second data.

5. The fiber sensing system as claimed in claim 4, wherein the central office comprises a processing unit analyzing the first and second data with a lookup table to determine where a fault point of the ring structures is.

6. The fiber sensing system as claimed in claim 5, wherein a processing unit adjusts the tunable laser source, such that the light source outputted from the tunable laser source has a central wavelength corresponding to the fiber sensor.

7. The fiber sensing system as claimed in claim 1, wherein the fiber sensor is a fiber bragg grating.

8. The fiber sensing system as claimed in claim 1, wherein the fiber sensor reflects the light source signal to generate a reflective signal corresponding to the fiber sensor when the fiber sensor receives the light source signal.

9. A fiber sensing method, comprising
providing a plurality of ring structures to form a plurality of loops by an optical coupler directly connected to each of the ring structure, wherein each of the ring structures comprises at least one fiber sensor to receive and reflect a light source signal; and
forming a first path and a second path in the loops, such that the light source signal is injected into the first path and the second path respectively by a switching unit, wherein the switching unit is disposed in a central office, and the output terminals of the switching unit are coupled to the ring structures by the optical coupler without a remote node or another optical coupler.

10. The fiber sensing method as claimed in claim 9, further comprising analyzing first and second reflective signals respectively reflected from the first and second paths to determine where a fault point of the ring structures is.

11. The fiber sensing method as claimed in claim 10, wherein the central office comprises a tunable laser source outputting the light source signal to the switching unit.

12. The fiber sensing method as claimed in claim 11, wherein the tunable laser source is a tunable Erbium-fiber laser.

13. The fiber sensing method as claimed in claim 12, wherein the fiber sensor is a fiber bragg grating.

14. The fiber sensing method as claimed in claim 9, wherein the fiber sensor reflects the light source signal to generate a reflective signal corresponding to the fiber sensor when the fiber sensor receives the light source signal.

* * * * *